(12) United States Patent
Wang (10) Patent No.: US 10,715,446 B2
(45) Date of Patent: Jul. 14, 2020

(54) METHODS AND SYSTEMS FOR DATA CENTER LOAD BALANCING

(71) Applicant: Zixiong Wang, Ottawa (CA)

(72) Inventor: Zixiong Wang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 83 days.

(21) Appl. No.: 15/262,540

(22) Filed: Sep. 12, 2016

(65) Prior Publication Data

US 2018/0077064 A1    Mar. 15, 2018

(51) Int. Cl.
*H04L 12/803* (2013.01)
*H04L 12/801* (2013.01)
*H04L 29/06* (2006.01)
*H04L 12/721* (2013.01)
*H04L 12/933* (2013.01)
*H04L 12/723* (2013.01)

(52) U.S. Cl.
CPC .......... *H04L 47/125* (2013.01); *H04L 47/115* (2013.01); *H04L 69/22* (2013.01); *H04L 45/26* (2013.01); *H04L 45/50* (2013.01); *H04L 47/11* (2013.01); *H04L 49/1515* (2013.01)

(58) Field of Classification Search
CPC ......... H04L 12/46; H04L 47/10; H04L 47/29; H04L 47/30; H04L 47/33; H04L 47/115; H04L 47/263; H04L 47/11; H04L 47/125; H04L 45/26
USPC ..... 370/230.1, 235–237, 252, 229, 230, 351
See application file for complete search history.

(56) References Cited

U.S. PATENT DOCUMENTS

| | | | |
|---|---|---|---|
| 9,660,914 B1* | 5/2017 | Zhou | H04L 47/11 |
| 2003/0214913 A1 | 11/2003 | Kan et al. | |
| 2007/0047446 A1 | 3/2007 | Dalal et al. | |
| 2014/0119193 A1* | 5/2014 | Anand | H04L 47/125 370/237 |
| 2014/0140212 A1* | 5/2014 | Morandin | H04L 47/125 370/235 |
| 2015/0127797 A1 | 5/2015 | Attar et al. | |
| 2015/0281102 A1* | 10/2015 | Lee | H04L 47/115 370/236 |
| 2018/0139132 A1 | 5/2018 | Edsall et al. | |

FOREIGN PATENT DOCUMENTS

| | | |
|---|---|---|
| CN | 101083616 A | 12/2007 |
| CN | 101365169 A | 2/2009 |
| CN | 101427497 A | 5/2009 |
| CN | 102065000 A | 5/2011 |
| CN | 103414650 A | 11/2013 |
| CN | 103873367 A | 6/2014 |
| CN | 105706400 A | 6/2016 |
| EP | 2139154 A1 | 12/2009 |
| GB | 2508891 A | 6/2014 |

* cited by examiner

*Primary Examiner* — Harun Chowdhury (57) ABSTRACT

Methods and systems for collecting congestion information at a switch of a leaf-spine network. The switch processes a path finding packet. Congestion information is obtained relating to congestion between ports of the switch. The congestion information is inserted into the payload of the path finding packet. The switch multicasts the path finding packet.

12 Claims, 7 Drawing Sheets

METHODS AND SYSTEMS FOR DATA CENTER LOAD BALANCING

FIELD

The present disclosure relates to methods and systems for load balancing of traffic in a communication network.

BACKGROUND

Multi path load balancing is a technology designed to achieve high throughput, low latency, and high availability for data center networks. A commonly used solution, Equal Cost Multi Path (ECMP), has been found to be unsatisfactory for data center networks. A reason ECMP has been found unsatisfactory is that ECMP applies a statically configured hash function to selected packet header fields to decide the egress port of a packet, thus treating big packet flows the same way as small packets flows. If multiple big packet flows are hashed to the same port, and the aggregated rate of these big packet flows exceeds the port utilization, then some of these big packet flows cannot be assigned to the port, which leads to lower port utilization and lower throughput.

Dynamic load balancing schemes rely on flowlet switching. Generally, packets of a given packet flow are divided into many different packet groups, where a packet group consists of a burst of packets for the given packet flow with little inter-packet gap. Such a packet group is referred to as a flowlet. There are typically large enough time gaps between two flowlets of the same packet flow, such that individual flowlets in a packet flow can be switched to different network paths without causing out-of-order packet transmission. Flowlet switching can enhance throughput of data center networks. However, existing solutions may be limited to a two-tier leaf-spine data center network topology; may rely on proprietary packet formats; may not be applicable to layer 2 or layer 3 packets; and/or may require each leaf switch to maintain information about the status of all network paths involving the leaf switch's egress ports, resulting in high processing and memory costs.

SUMMARY

In some examples, the present disclosure describes a method for collecting congestion information at a switch of a leaf-spine network. The method includes obtaining a path finding packet and obtaining congestion information relating to congestion between ports of the switch. The congestion information is inserted into a payload of the path finding packet, and the path finding packet is transmitted.

In various examples, the congestion information collected by the path finding packet relates to congestions expected to be experienced by a packet forwarded in a direction opposite to a direction traversed by the path finding packet.

In some examples, the present disclosure describes a method, at a first leaf switch of a leaf-spine network, for determining preferred path information. The preferred path information defines a preferred path for forwarding a packet from the first leaf switch to a second leaf switch. A path finding packet is received. The preferred path information is determined using congestion information obtained from a payload of the path finding packet, the congestion information being associated with one or more switches traversed by the path finding packet. The preferred path information is stored in association with an identifier for the second leaf switch.

In some examples, the present disclosure describes a method for selecting a preferred path for a packet to be forwarded in a leaf-spine network. A trigger for selecting a preferred path for a received packet is received. Preferred path information associated with a destination leaf switch for the packet is selected. The preferred path information defines at least one egress port of at least one switch to be used for forwarding the packet. The packet is transmitted from an uplink port in accordance with the selected preferred path information.

In some examples, the present disclosure describes network switches in a leaf-spine network, including a leaf switch, an aggregation switch and a spine switch, which perform various embodiments of the methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
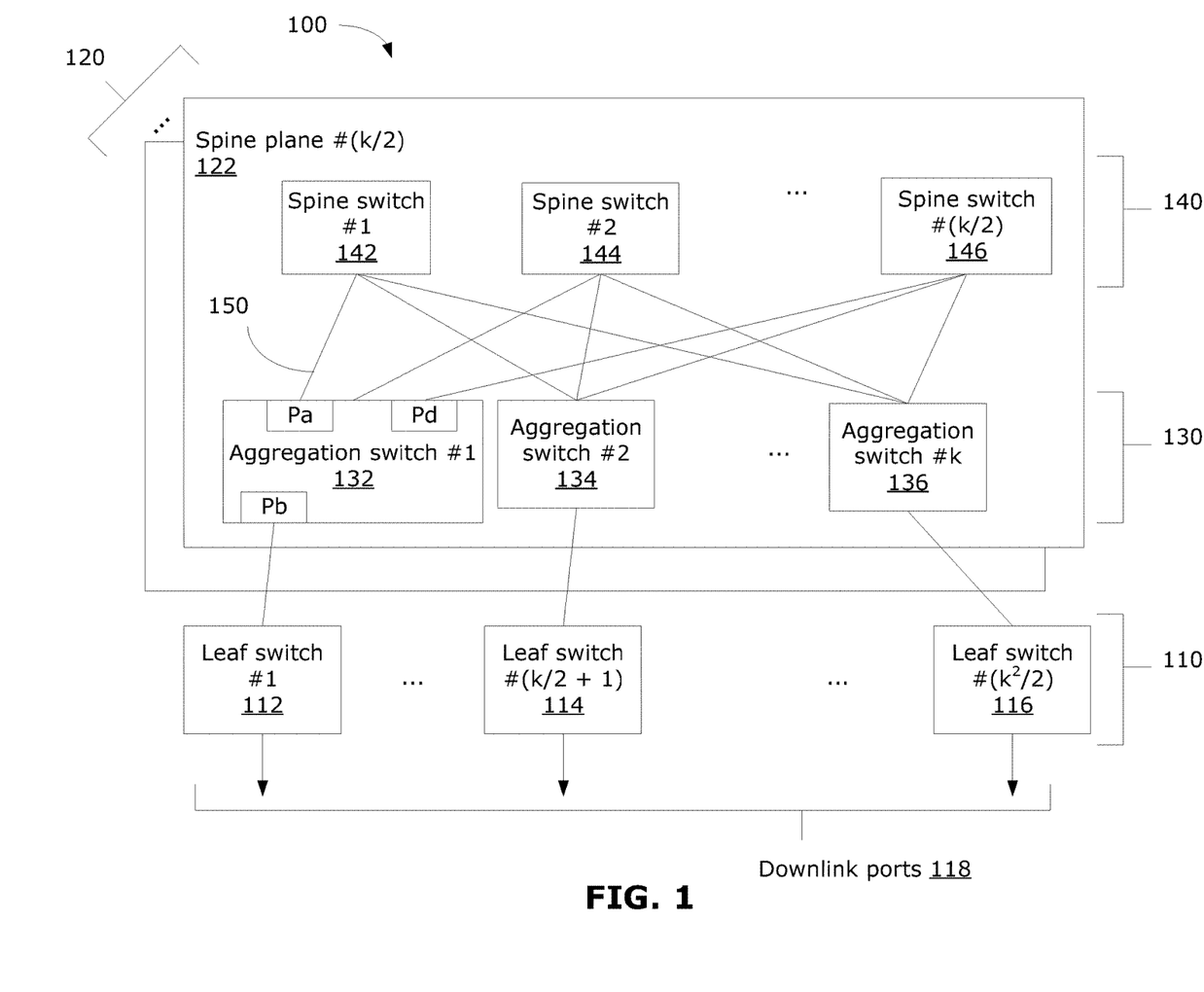
FIG. 1 is a schematic diagram illustrating an example three-tier leaf-spine network.

FIG. 1 is a schematic diagram of an example leaf-spine communication network 100. In the example network 100, a plurality of leaf switches 110 provide connections for end devices (not shown). An end device may include a desktop computer or a server, and a network switch may include a router, for example. In the present disclosure, a direct connection between two switches may be referred to as a link, while the term path may be used to refer to the sum of all links (including any intermediate switches between the source and destination switches) traveled by a packet from an source switch to a destination switch.

Leaf switches 110 do not connect directly to any other leaf switch 110. There are $k^2/2$ leaf switches 110 in the example network 100. Generally, each switch in the network 100 may have k number of ports. Typically, k may be less than 257, although k may be larger in some cases. Shown are leaf switch #1 112, leaf switch #(k/2+1) 114 and leaf switch #($k^2/2$) 116. Transmission of packets take place via communication links 150 (e.g., fiber optic links). A plurality of spine switches 140 are provided over a plurality of spine planes 120. There are k/2 spine switches 140 in a single spine plane 120, in the example network 100. Shown are spine switch #1 142, spine switch #2 144 and spine switch #(k/2) 146. Spine switches 140 do not connect directly to any other spine switch 140. In the present disclosure, the direction from a leaf switch 110 towards a spine switch 140 is referred to as uplink, and the direction from a spine switch 140 towards a leaf switch 110 is referred to as downlink.

There are k/2 spine planes 120 in the example network 100. Spine plane #(k/2) 122 is shown in detail. For simplicity, the following description will be with respect to a single spine plane 120, however it should be understood that the description is generally applicable to all spine planes 120 in the network 100. For simplicity, the leaf switches 110 are shown with links 150 only to a single spine plane 120, however the leaf switches 110 may generally have links 150 to all spine planes 120, and the links 150 in each spine plane 120 may be similar to the links 150 shown for spine plane #(k/2) 122.

Each leaf switch 110 has uplink ports to connect to each spine plane 120. Thus, for (k/2) spine planes, each leaf switch 110 has (k/2) uplink ports (only one uplink port for each leaf switch 110 is shown for simplicity). Each leaf switch 110 has downlink ports 118 for connection of end devices to each spine plane 120. Thus, in the example shown there are $(k/2) \times (k^2/2) = (k^3/4)$ downlink ports 118 in total over all $(k^2/2)$ leaf switches 110.

The example network 100 is a three-tier leaf-spine network, including an aggregation tier. In this example, the leaf switches 110 are connected to the spine switches 140 via aggregation switches 130. There are k aggregation switches 130 in a single spine plane 120, in the example network 100. Shown are aggregation switch #1 132, aggregation switch #2 134 and aggregation switch #k 136. Aggregation switches serve to aggregate and route packets from a plurality of connected leaf switches 110. Each aggregation switch 130 is connected to every spine switch 140 via links 150. Generally, an aggregation switch 130 in a given spine plane 120 connects its associated leaf switches 110 to all spine switches 140 in the given spine plane 120. A leaf switch 110 has links 150 with multiple aggregation switches 130 across multiple spine planes 120, but connects to only one aggregation switch 130 for any one spine plane 120. Each aggregation switch 130 has uplink ports to connect to each spine switch 140 in a given spine plane 120. Thus, in the example shown each aggregation switch 130 has (k/2) uplink ports to connect to the (k/2) spine switches 140 in the spine plane 120. Each spine switch 140 has downlink ports to connect to each aggregation switch 130 in a given spine plane 120. Thus, in the example shown each spine switch 140 has k downlink ports to connect to the k aggregation switches 130 in the spine plane 120.

In general, a leaf-spine network has at least two tiers, namely the leaf tier and the spine tier. The example network 100 of FIG. 1 may be considered a three-tier network, with the addition of an aggregation tier. The present disclosure provides examples for the three-tier network of FIG. 1, however the teachings of the present disclosure may be generally applicable to leaf-spine networks having fewer or greater number of tiers.

Every leaf switch 110 is connected to every spine switch 140 (optionally via an aggregation switch 130). Packet flow between any pair of leaf switches 110 is carried out over a path that travels from the source leaf switch 110, to a spine switch 140 (optionally via an aggregation switch 130 connected to the source leaf switch 110), then to the destination leaf switch 110 (optionally via an aggregation switch 130 connected to the destination leaf switch 110). The port by which a packet exits a switch (also referred to as the egress port) determines the next switch that the packet arrives at. For example, aggregation switch #1 132 may have a port Pa that connects to spine switch #1 142. In order to direct a packet to arrive at spine switch #1 142, aggregation switch #1 132 places the packet in the queue for port Pa. The port at which a packet is received at a switch (also referred to as the ingress port) can be used to identify the switch from which the packet was sent. For example, aggregation switch #1 132 may have a port Pb to connects to leaf switch #1 112. Any packet received at port Pb can be determined to have been sent from leaf switch #1 112. It should be understood that a port can be a duplex port—that is, a single port can serve to both receive a packet (i.e., serve as an ingress port) and transmit a packet (i.e., serve as an egress port).

Congestion may be experienced by a packet as it travels from an ingress port to an egress port within the same switch. Congestion may depend on, for example, port utilization, a port's transmission rate, queue congestion at a port, and/or processor and memory resources at a switch. Switch congestion is of concern for data center load balancing. Various examples described herein may enable data center load balancing with lower cost and/or better scalability, compared to conventional approaches. In some examples, standard packet formats may be used.

The present disclosure describes example methods for path finding that finds a preferred network path from a source leaf switch to a destination leaf switch. A preferred network path may be defined as one with a congestion metric that satisfies a predeterminе criterion (e.g., lowest congestion). For example, the congestion metric may be based on path latency or port utilization, although other congestion metrics may be used. In the examples described herein, a Path Finding Packet (PFP) is used to collect congestion information for finding a preferred path. A PFP is a packet that is intended to carry, in its payload, congestion information. Although the PFP may additionally include other data in its payload, the main purpose of the PFP is for collection of congestion information, as discussed below.

Figure 2:
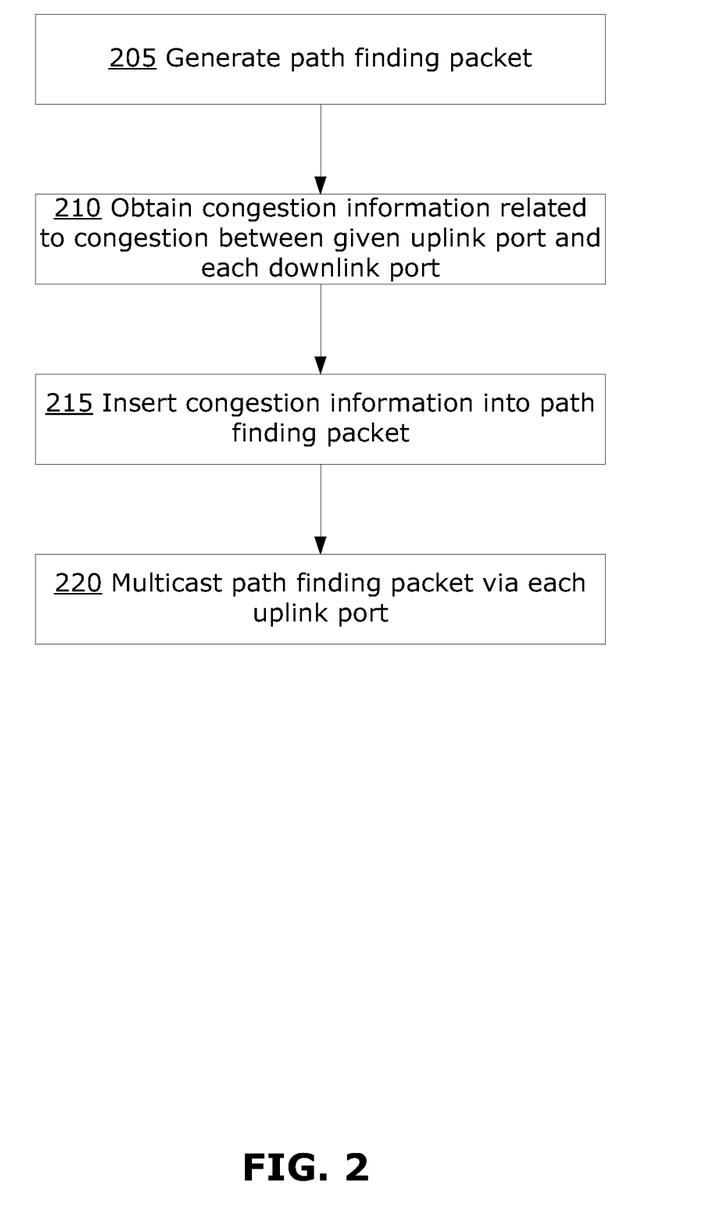
FIG. 2 is a flowchart illustrating an example method for generating a path finding packet.
Figure 3:
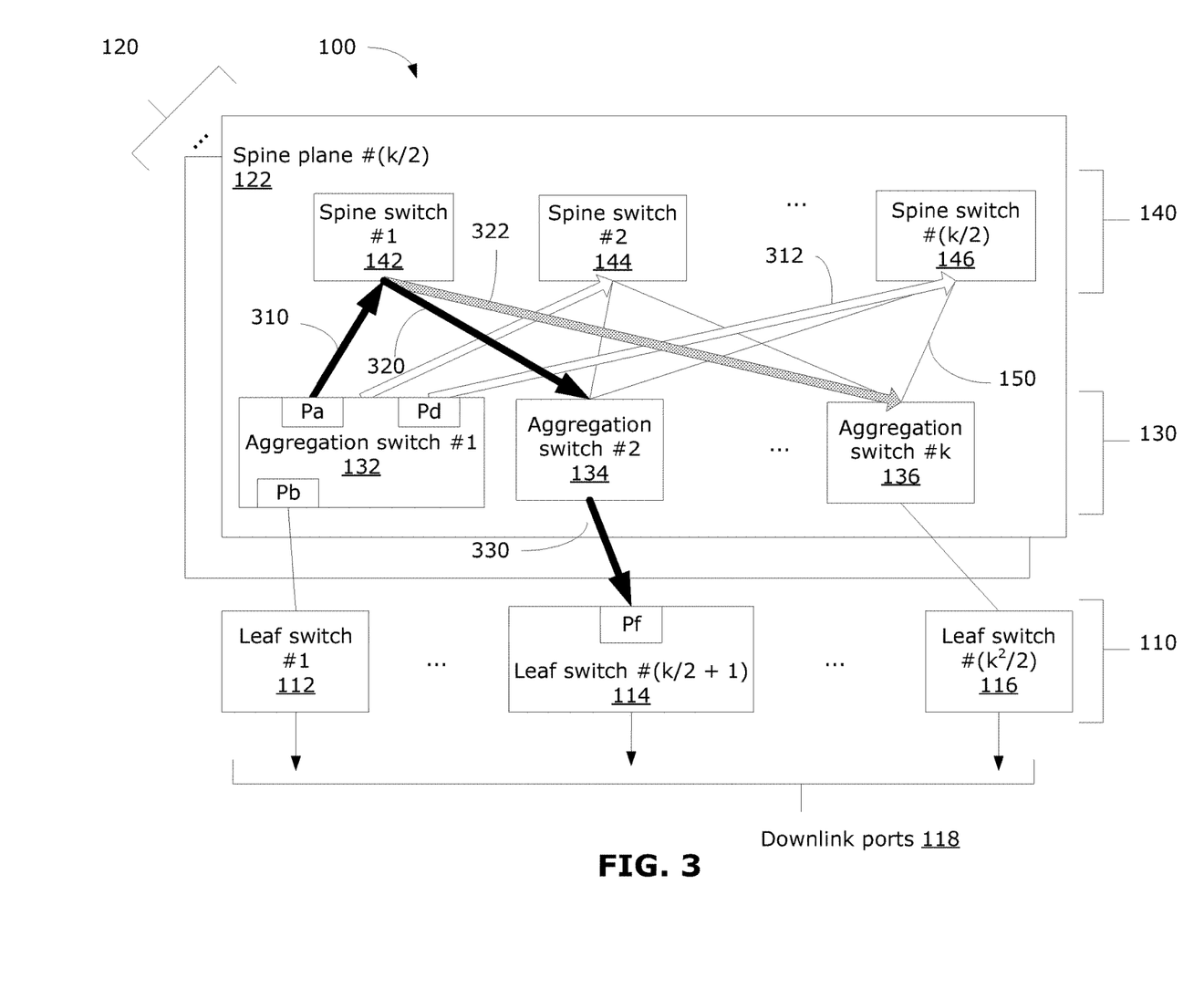
FIG. 3 is a schematic diagram illustrating an example propagation of path finding packets through the network of FIG. 1.

An example method for generation of a PFP is described below with reference to FIGS. 2 and 3.

The collection of congestion information may generally be initiated by an aggregation switch 130 obtaining the PFP, for example by generating the PFP. In the example of FIG. 3, the PFP is generated by aggregation switch #1 132, however any of the aggregation switches 130 may generate a PFP. In the present disclosure, an aggregation switch 130 that generates a PFP may be referred to as an initiating aggregation switch.

At 205, aggregation switch #1 132 generates a PFP. Aggregation switch #1 132 may periodically generate a PFP. The period for PFP generation may be any suitable time period, for example in the range of about 100 µs to about 10 ms. PFPs may be generated and propagated through the network 100 at selected time intervals (e.g., every 200 µs) to ensure collection of up-to-date congestion information. It may be useful to increase the frequency of PFP generation when traffic in the network 100 is rapidly changing. It may be useful to have an upper limit on the frequency at which PFPs are generated, to avoid excessive overhead on the network 100.

For each of its uplink ports connecting to a spine switch 140, aggregation switch #1 132 generates a PFP to carry congestion information related to that particular uplink port. For example, if aggregation switch #1 132 has two uplink ports Pa and Pd, aggregation switch #1 132 generates one PFP to carry congestion information related to port Pa, and another PFP to carry congestion information related to port Pd. For simplicity, FIG. 2 is described with respect to a single PFP generated to carry congestion information related to a given uplink port Pa.

The PFP may be generated using standard packet format. In some examples, the PFP may be generated as a standard multicast packet (e.g., having multicast information in the packet header) to enable the PFP to be multicast, as described further below. Sending the PFP as a multicast packet may be useful to save bandwidth. The multicast group identifier used in the PFP header may be set by the control plane. To avoid transmission of the PFP being blocked by other packets queued for transmission, the PFP may be designated as a high priority packet (e.g., having priority set to the highest priority in the packet header). A switch may also have a dedicated queue for PFPs.

At 210, aggregation switch #1 132 obtains congestion information related to congestion between given uplink port Pa and each downlink port. Examples of how congestion information is obtained will be described further below. The congestion information obtained relates to the congestion that would be experienced by a packet transmitted from the downlink ports. In some examples, congestion information relating to congestion between uplink and downlink ports may only require information relating to the downlink port (e.g., where congestion is not dependent on the uplink port).

At 215, the congestion information is inserted into the PFP, for example into the payload of the PFP. The congestion information may be carried in the payload as a set of records, each record associating congestion information with a respective downlink port. In the example discussed below, the congestion information includes port utilization information and switch delay information, and is associated with an identifier identifying the port. For example, a record may have the following fields:

Leaf_ID (e.g., 16 bits long): identifier identifying the leaf switch connected to the downlink port. In the case of a downlink port to a leaf switch, an identifier of the leaf switch may be used to identify the downlink port.

Port_utilization (e.g., 8 bits long): provides information about port utilization of the downlink port. Port utilization may be defined as ratio of measured actual port transmission rate over the port capacity. For an example, if a port's capacity is 10 Gbps, and the measured actual port transmission rate is 5 Gbps, then the port utilization is 5 Gbps/10 Gbps=0.5.

Hop_delay (e.g., 16 bits long): provides information about the switch delay from the uplink port to the downlink port associated with the leaf switch represented by Leaf_ID.

The switch delay may be approximated as a temporary path delay between the downlink port and the uplink port. For example, the calculation may be:

Tmp_path_delay=(average output queue length of port $Pb$)/(speed of port $Pb$)

where Tmp_path_delay is the temporary path delay and port Pb is the downlink port. In this example calculation, aggregation switch #1 132 maintains the average output queue length for each port. The average output queue length for a port may be updated as follows:

New average output queue length=$w$*(current instantaneous output queue length)+$(1-w)$*(old output average queue length)

where w is a decay factor that lessens the impact of older average queue length values. The larger the value of w, the lesser the impact of old average queue length on the calculation result.

Aggregation switch #1 132 may set Hop_delay= Tmp_path_delay. It should be noted that that Hop_delay depends only on the downlink port and is independent of the uplink port.

Other methods of calculating port utilization and switch delay information may be used. As well, other congestion information may be collected.

At 220, aggregation switch #1 132 multicasts the PFP via each of its uplink ports. This is shown as black arrow 310 and white arrows 312 in FIG. 3. Arrows shown in FIG. 3 indicate transmission of a PFP along a network link 150. Thus, all spine switches 140 linked to aggregation switch #1 132 receives the PFP. Although the PFP contains congestion information related to a particular uplink port, the PFP is multicast via all uplink ports. For example, the PFP containing congestion information related to congestion between given uplink port Pa and downlink ports is multicast via uplink port Pa as well as all other uplink ports of aggregation switch #1 132. Aggregation switch #1 132 similarly generates and multicasts PFPs containing congestion information related to all of its other uplink ports. In this way, all spine switches 140 linked to aggregation switch #1 132 receive PFPs containing congestion information related to all uplink ports of aggregation switch #1 132.

The collection of congestion information continues with insertion of additional congestion information into a PFP as it is propagated through the network 100. This will be described with reference to FIGS. 3 and 4. All switches encountered by a PFP, with the exception of the initiating aggregation switch and the final destination leaf switch, may carry out the example method described below to insert congestion information into the PFP.

The following description is in the context of a PFP that is generated at aggregation switch #1 132, is transmitted along the path indicated by black arrows 310, 320, 330, and finally received at leaf switch #(k/2+1) 114. That is, the PFP generated at aggregation switch #1 132 is multicast (black arrow 310 and white arrows 312) to all spine switches 140. Following arrow 310, the PFP is received at spine switch #1 142. The PFP is processed at spine switch #1 142, for example as described below, then multicast (black arrow 320 and gray arrow 322) to all aggregation switches 130 excluding aggregation switch #1 132. Following arrow 320, the PFP is received at aggregation switch #2 134, where it is processed, for example as described below. The PFP is then transmitted (black arrow 330) to leaf switch #(k/2+1) 114. Processing of the PFP at a final leaf switch 110 will be described further below.

Figure 4:
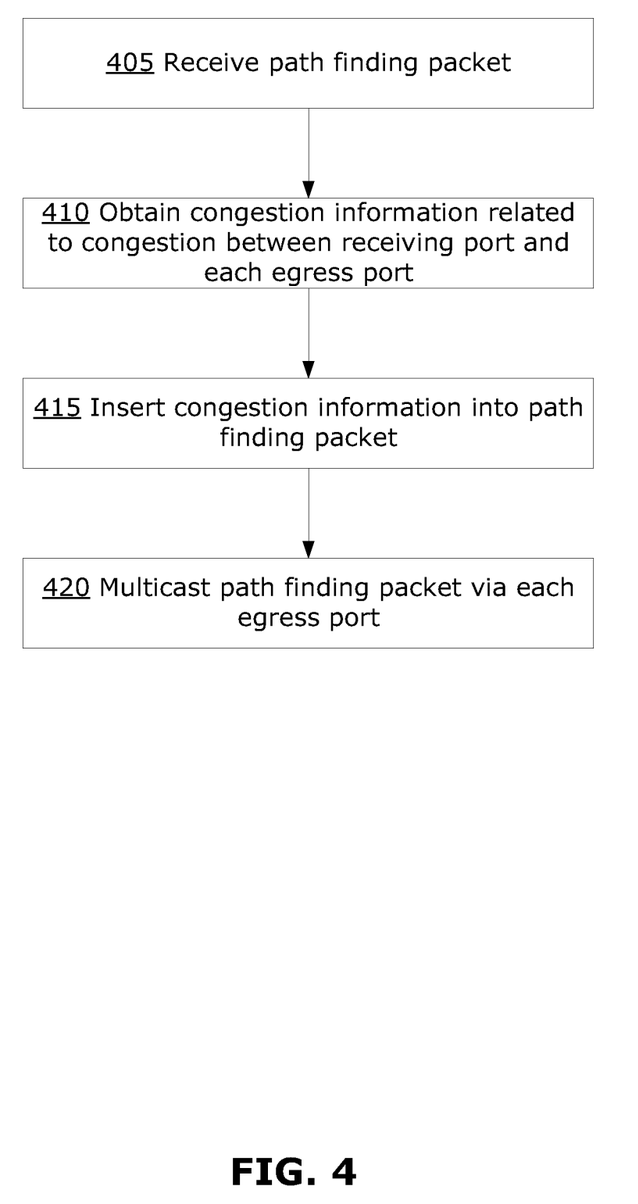
FIG. 4 is a flowchart illustrating an example method for processing a path finding packet at a network switch.

At 405, the switch obtains the PFP, for example by receiving the PFP at ingress port Py. The switch may identify a received packet as being a PFP based on a specific protocol type value, a specific tag value or a specific source address value in a packet header field, for example. The following description is applicable to the case of the PFP being received at a spine switch 140 such as spine switch #1 142, as well as the case of the PFP being received at an aggregation switch 130 such as aggregation switch #2 134.

At 410, the switch obtains congestion information. The congestion information relates to congestion between the receiving port at which the PFP arrived and each of the egress ports via which the PFP may be propagated. The congestion information obtained relates to the congestion that would be experienced by a packet traveling in reverse direction to the path traveled by the PFP. That is, when the PFP is received at a receiving port Py, the congestion information obtained by the switch relates to congestion that would be experienced by a packet exiting from port Py. In some examples, congestion information relating to congestion between the receiving port and an egress port may only require information relating to the receiving port.

The congestion information may include port utilization information and switch delay information. For example, in the case of a spine switch 140, port utilization information may be determined by calculating the actual port transmission rate of ingress port Py from the length and time of received packets using a moving average scheme. In the case of an aggregation switch 130, port utilization information may be determined by calculating the actual port transmission rate of port Py. The switch delay information may be calculated as described above for Hop_delay.

At 415, the congestion information is inserted into the PFP. For example, an additional record may be added to the PFP payload, with Port_utilization and Hop_delay fields as described above. Instead of the Leaf_ID field, the record may have a Switch_ID field (e.g., 16 bits long) containing an identifier of the switch. In the case of an aggregation switch 130, the record may additionally include an identifier for ingress port Py.

At 420, the PFP is multicast according to whether it has been processed by a spine switch 140 or an aggregation switch 130. In the case of a spine switch 140, the PFP is multicast to all ports other than the receiving port at which the PFP arrived. For example, spine switch #1 142 multicasts the PFP to aggregation switch #2 134 (black arrow 320) and aggregation switch # k 136 (gray arrow 322), but not to aggregation switch #1 132. Aggregation switch #2 134 multicasts the PFP via all downlink ports (black arrow 330).

Where the PFP is propagated through multiple tiers before finally arriving at a leaf switch 110, the example method of FIG. 4 may be carried out by each switch (aside from the initiating aggregation switch 130 and the final leaf switch 110) that receives the PFP. For example, in the context of FIG. 3, spine switch #1 142 may perform the method of FIG. 4 to process and propagate the PFP, then aggregation switch #2 134 may also perform the method of FIG. 4 to process and propagate the PFP. Thus, the example method described above may be performed repeatedly by different switches as the PFP is propagated through the network 100. In this way, the PFP received at the final leaf switch 110 provides congestion information collected from all switches encountered by the PFP along the path from the initiating aggregation switch 130 to the final leaf switch 110. The congestion information carried by the PFP may generally relate to congestion that would be experienced by a packet traveling in the reverse direction to the direction traveled by the PFP. That is, when the PFP has traversed a path from aggregation switch #1 132 to leaf switch #(k/2+1) 114, the congestion information contained in the PFP relates to congestion that would be experienced by a packet traveling along a path from leaf switch #(k/2+1) 114 to aggregation switch #1 132.

Although the above description describes the PFP being received and processed at two tiers (namely a spine tier and an aggregation tier) of a three-tier network, it should be understood that the PFP may be similarly received and processed at fewer or greater number of tiers, where the network has fewer or greater than three tiers. Where there are more than three tiers, the PFP may be processed at additional tiers, other than the spine tier, similar to the processing described above at the aggregation switch.

When the PFP is received at a leaf switch 110, the leaf switch 110 processes the congestion information carried by the PFP and terminates the PFP. The congestion information is used by the leaf switch 110 to determine information defining a preferred path that may be used to forward a packet to another leaf switch 110. The information defining a preferred path may be referred to as preferred path information, in the present disclosure. Using congestion information provided by multiple PFPs propagated throughout the network 100, the leaf switch 110 is able to determine preferred path information for packet forwarding to all other leaf switches 110. The preferred path information is used by the leaf switch 110 for packet forwarding, discussed further below.

Figure 5:
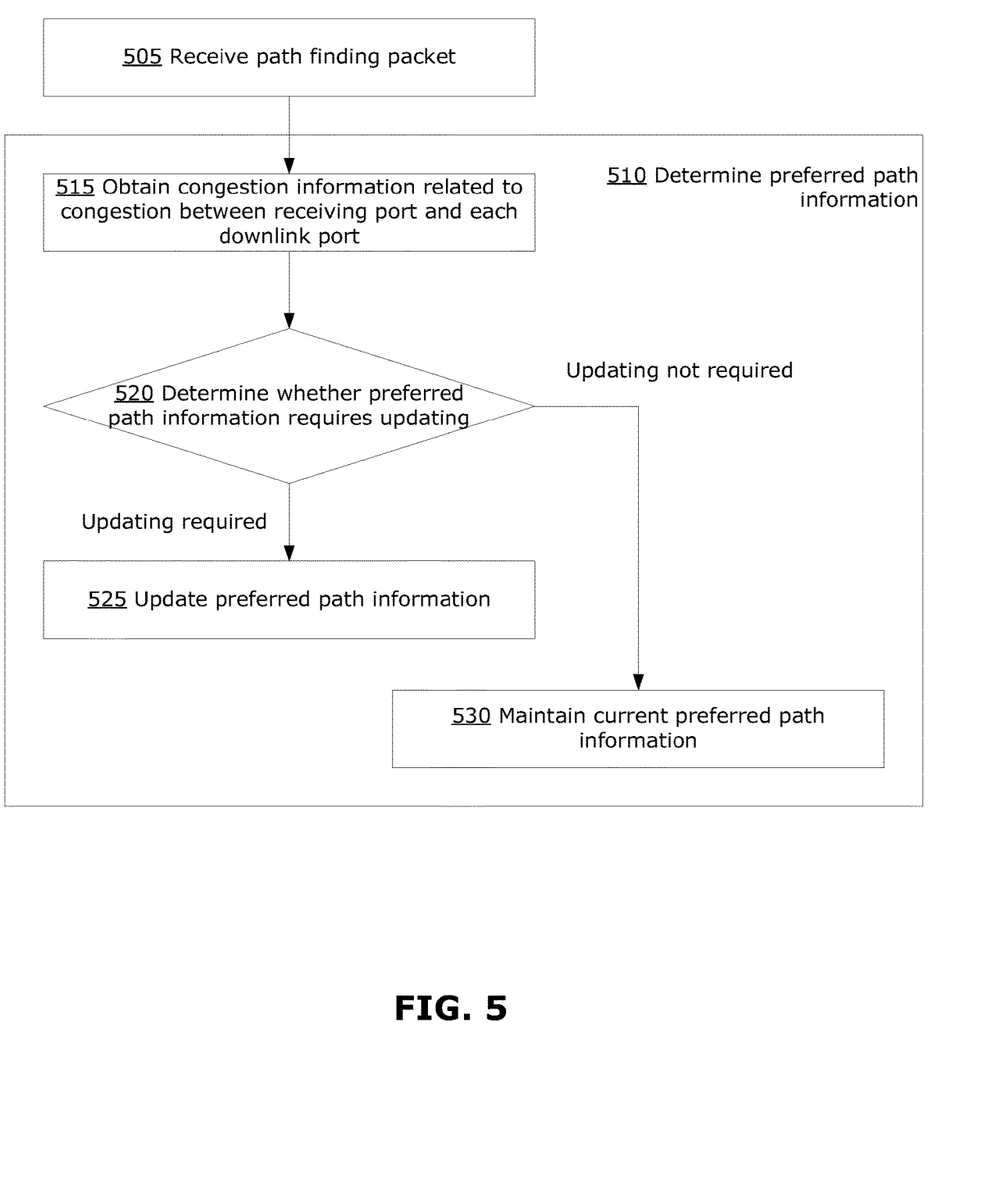
FIG. 5 is a flowchart illustrating an example method for determining preferred path information using a path finding packet.

FIG. 5 is a flowchart illustrating an example method, performed by a leaf switch 110, for determining preferred path information using the PFP.

The leaf switch 110 maintains, in its memory, existing preferred path information. The existing preferred path information may be based on previously obtained congestion information (e.g., obtained from a previous PFP), or may be default or estimated preferred path information (e.g., where the leaf switch 110 has yet to receive any congestion information from a PFP). In some examples, the preferred path information may be maintained in the memory of the leaf switch 110 in the form of a Best Path Table (BPT). In some examples, the leaf switch 110 may store information about multiple alternate preferred paths (e.g., up to four possible preferred paths) that may be used to reach a specific destination leaf switch 110. This may avoid the possibility that one preferred path becomes overly used.

In some examples, information about a preferred path to a particular destination leaf switch 110 may be stored in the BPT as a record associated with the destination leaf switch 110 (e.g., indexed according to the identifier of the destination leaf switch 110). Because the destination switch at which a packet arrives is determined by the egress port from which the packet is sent from the source switch, a preferred path may be defined in the preferred path information by specifying the egress ports from which a packet should be transmitted at one or more switches along the preferred path. The preferred path information may further include congestion information associated with the defined preferred path. A record stored in the BPT defining a preferred path to reach a certain destination leaf switch 110 may contain the following fields, for example:

Leaf_Port_ID (e.g., 8 bits long): identifier of the uplink port from the source leaf switch 110.

Agg_Port_ID (e.g., 8 bits long): identifier of the uplink port from the aggregation switch 130 linked to the source leaf switch 110.

Best_Path_Port_utilization: Indicates maximum port utilization of all ports along the defined preferred path.

Best_Path_delay (e.g., 16 bits long): information about the path delay associated with the defined preferred path.

More generally the record may contain identifier fields to store port identifiers for all uplink ports traversed in the upstream portion of the path. Although the example discussed above includes identifiers for the egress ports of the source leaf switch 110 and the linked aggregation switch 130, additional fields may be added to include identifiers for egress ports of additional uplink tiers, in the case where the network has additional tiers. Similarly, fewer port identifier fields may be used where the network has fewer tiers. It may be sufficient to define the preferred path using only port identifiers for the upstream portion of the path since destination lookup techniques may be used for the downstream portion of the path.

The stored preferred path information may be updated using the received PFP as described below. The following description describes the method being performed at leaf switch #(k/2+1) 114 having received a PFP that was propagated as shown in FIG. 3 and discussed above, for example. Generally, the following example method is performed by each leaf switch 110 that receives and terminates the PFP.

At 505, leaf switch #(k/2+1) 114 receives the PFP at an uplink port (e.g., port Pf).

At 510, leaf switch #(k/2+1) 114 determines preferred path information using the congestion information provided by the PFP. This may involve steps 515, 520, 525 and 530 described below.

At 515, leaf switch #(k/2+1) 114 obtains congestion information about its own ports. The congestion information is related to transmission between the port at which the PFP was received (e.g., port Pf) and each of its downlink port. For example, leaf switch #(k/2+1) 114 may calculate the port utilization and the switch delay between a given downlink port Pg to uplink port Pf, similarly to the calculations described above. The congestion information may represent the congestion that would be experienced by a packet being transmitted from the uplink port Pf. In some examples, the congestion information may only require information relating to the uplink port Pf.

At 520, leaf switch #(k/2+1) 114 determines whether the currently stored preferred path information should be updated. This determination may be based on a comparison of congestion metrics. If the comparison satisfies a criterion (e.g., the congestion information from the PFP has a better congestion metric (i.e., indicating less congestion) than the congestion metric of the preferred path information currently stored in the BPT), the stored preferred path information should be updated.

For determining preferred path information used to reach a given destination leaf switch 110 (e.g., leaf switch #1 112), leaf switch #(k/2+1) 114 considers congestion information provided by a PFP initiated by the aggregation switch 130 linked to that destination leaf switch 110. For example, to determine whether the stored preferred path information used to reach leaf switch #1 112 should be updated, leaf switch #(k/2+1) considers congestion information provided by the PFP initiated by aggregation switch #1 132.

In an example, leaf switch #(k/2+1) 114 may first perform a comparison based on port utilization. If the comparison based on port utilization is inconclusive (e.g., port utilization values are equal or similar), a further comparison based on switch delay may be carried out.

In this example, leaf switch #(k/2+1) 114 first calculates a temporary port utilization (Tmp_port_utilization) as follows:

Tmp_port_utilization=Max(port utilization of Pf, port utilization added by spine switch 140 traversed by the PFP, port utilization added by adjacent aggregation switch 130, port utilization added by remote aggregation switch 130 traversed by the PFP)

Leaf switch #(k/2+1) 114 also calculates a temporary path delay (Tmp_path_delay) as follows:

Tmp_path_delay=hop delay from Pg to Pf+hop delay of spine switch 140 traversed by the PFP+hop delay of adjacent aggregation switch 130+hop delay of remote aggregation switch 130 traversed by the PFP.

If Tmp_port_utilization is less than the Best_Path_port_utilization of any stored preferred path information indexed for destination leaf switch #1 112, then updating is required. At 525, the preferred path information in the BPT with the largest Best_Path_port_utilization value may be updated as follows:

Leaf_Port_ID=ID of port Pf
Agg_Port_ID=Agg_Port_ID from the PFP
Best_Path_port_utilization=Tmp_port_utilization
Best_Path_delay=Tmp_path_delay If Tmp_port_utilization is equal to or about the same as the Best_Path_port_utilization of any stored preferred path information indexed for destination leaf switch #1 112, and Tmp_port_utilization is larger than a software configurable threshold, then Tmp_path_delay is considered to determine whether updating is required. Tmp_port_utilization may be considered to be about the same as the Best_Path_port_utilization when the difference between these values is smaller than a software configurable threshold.

Of the stored preferred path information having Best_Path_port_utilization equal or similar to Tmp_port_utilization, if Tmp_path_delay is less than the Best_Path_delay, then updating is required. At 520, the preferred path in the BPT with the largest Best_Path_delay value may be updated as discussed above.

Otherwise, it is determined that updating is not required (i.e., the currently stored preferred path information has a better congestion metric). At 530, the currently stored preferred path information is maintained.

Other methods of determining and updating the preferred path information may be used. After the example method of FIG. 5 is performed, the PFP may be terminated (e.g., discarded).

The leaf switch 110 may also perform BPT aging (e.g., using a mechanism similar to MAC table aging) to ensure that entries in the BPT are up-to-date. The scan period may be configurable, for example in a time range from about 1 ms to about 200 ms. If an entry in the BPT has not been updated for a period longer than the scan period, that entry may be marked as out-of-date and may be no longer used.

The stored preferred path information is used by the leaf switch 110 for packet forwarding. Packets are forwarded along a preferred path in reverse direction from that traversed by a PFP. Thus, in various examples described herein, congestion information is collected in the reverse direction of packing forwarding. An example method for packet forwarding is described below with reference to FIGS. 6 and 7.

Figure 6:
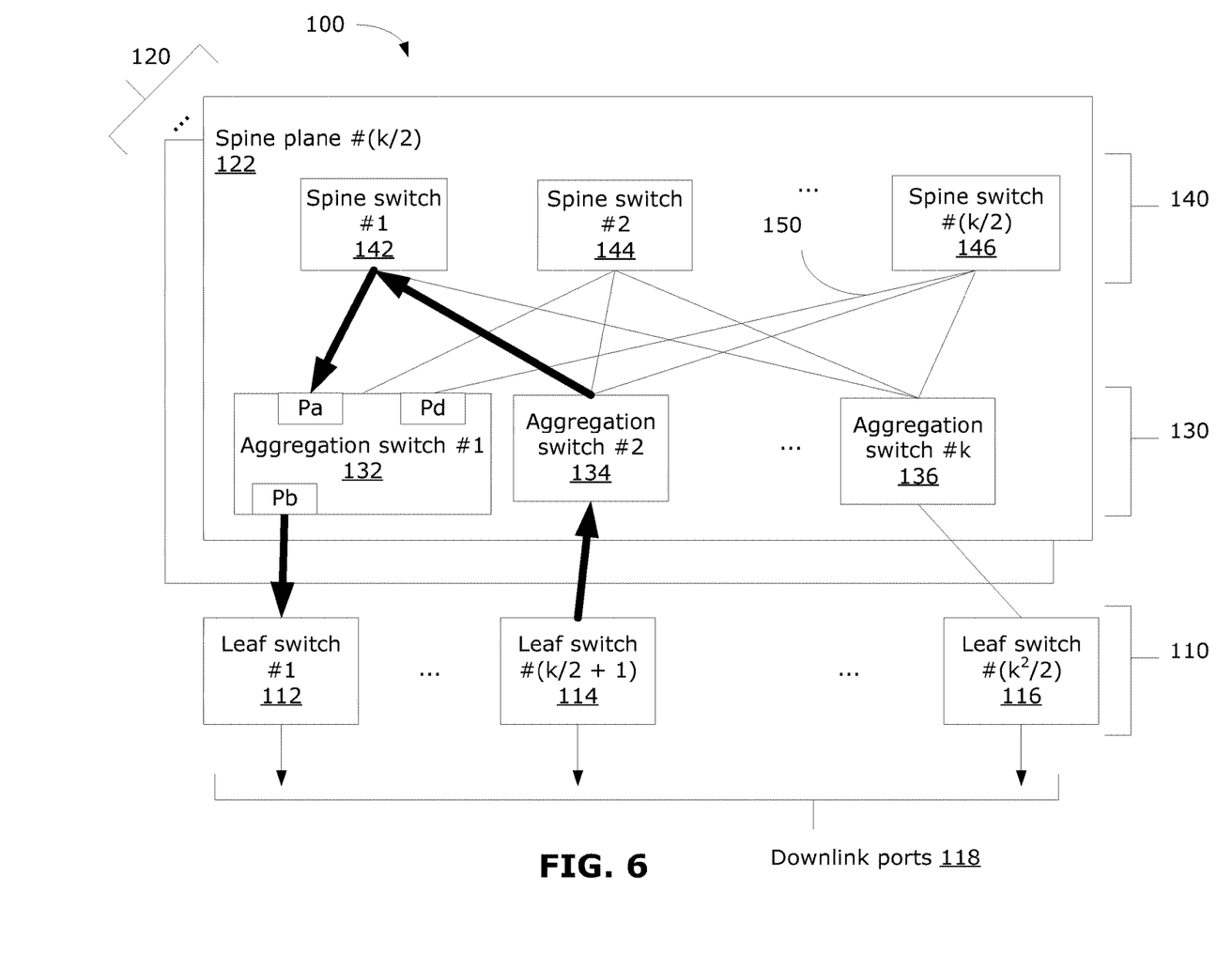
FIG. 6 is a schematic diagram illustrating an example of packet forwarding through the network of FIG. 1.

FIG. 6 illustrates an example preferred path (indicated by black arrows) from source leaf switch #(k/2+1) 114 to destination leaf switch #1 112. Leaf switch #(k/2+1) 114 may perform the example method of FIG. 7 to select a preferred path for forwarding a packet. Generally, the example method of FIG. 7 may be performed by any source leaf switch 110. The example method of FIG. 7 may be performed at the start of a new flow or when a flowlet of an existing is ready to be switched to another path. Determination of whether a flowlet should be switched to another path may be carried out using a flowlet table, as described further below.

Figure 7:
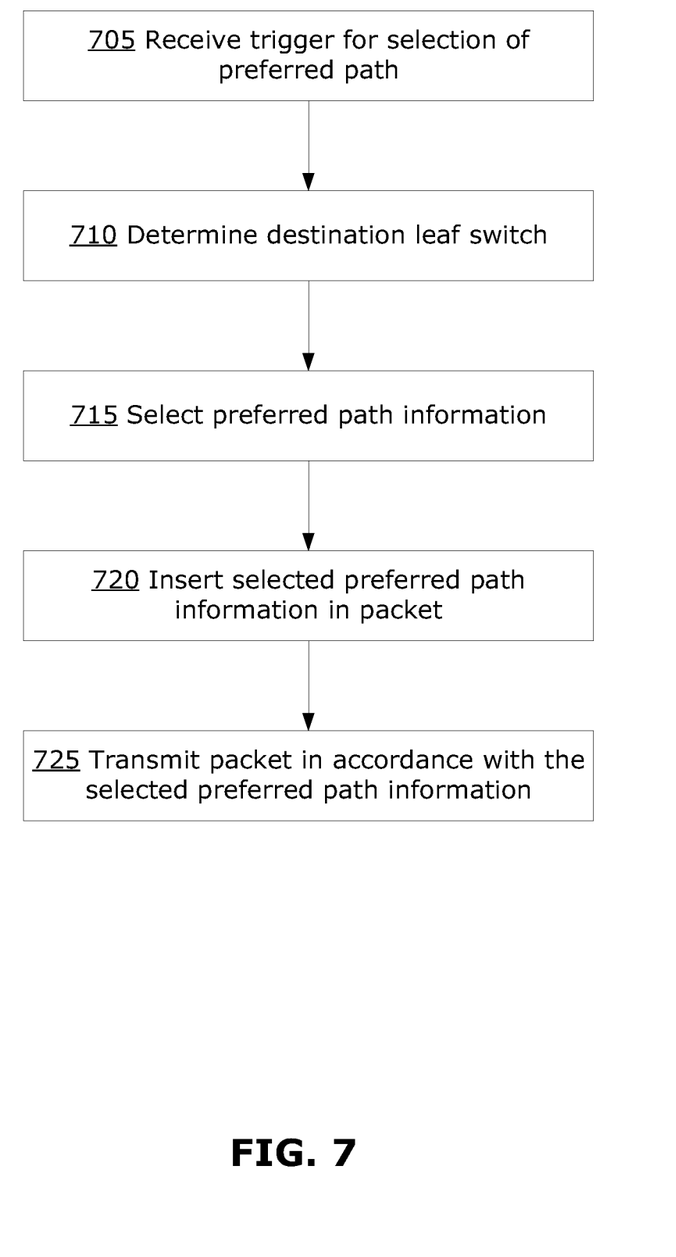
FIG. 7 is a flowchart illustrating an example method for selecting a preferred path for forwarding a packet.

At 705, leaf switch #(k/2+1) 114 receives a trigger for the selection of a preferred path. This trigger may be the receipt of a packet (e.g., from a connected end device) for a new flow to be forwarded to another end device. This trigger may also be the result of leaf switch #(k/2+1) determining (e.g., using a flowlet table as described further below) that the packet is part of a flowlet that is ready to be switched to another path.

At 710, leaf switch #(k/2+1) 114 determines the destination leaf switch (e.g., using conventional destination lookup) to which the destination end device is connected. In the example of FIG. 6, the destination leaf switch is leaf switch #1 112.

At 715, leaf switch #(k/2+1) 114 selects the preferred path information stored in its memory (e.g., in its BPT) for forwarding the packet. For example, the identifier of leaf switch #1 112 may be used as an index to look up one or more records stored in the BPT. Where there are two or more preferred path records indexed for leaf switch #1 112, leaf switch #(k/2+1) 114 may select one preferred path record randomly or according to a predefined criteria (e.g., which preferred path has been least used or which was not used last).

At 720, leaf switch #(k/2+1) 114 inserts the selected preferred path information in the packet. Only a portion of the preferred path information may be inserted, rather than the entire stored record. For example, leaf switch #(k/2+1) 114 may modify the header of the packet to contain information identifying the port(s) to be used by one or more subsequent switches for forwarding the packet. It may be sufficient for the packet header to identify the port(s) to be used in the upstream portion of the path.

In the example of FIG. 6, the header of the packet may be modified to identify the uplink port to be used by aggregation switch #2 134 in order to forward the packet to spine switch #1 142. For example, leaf switch #(k/2+1) 114 may insert a multiprotocol label switching (MPLS) label after the MAC header of the packet, where the value of the MPLS label is set to identify the egress port to be used by aggregation switch #2 134. Where there are more tiers in the network, additional MPLS labels may be inserted to identify the egress port(s) to be used by other tier(s). Where there are fewer tiers in the network (e.g., there is no aggregation tier), it may not be necessary to insert preferred path information into the packet.

In examples where the preferred path information is stored in association with a flowlet (e.g., using a flowlet table as described below), leaf switch #(k/2+1) 114 may update the stored preferred path information for the flowlet with the selected preferred path information.

At 725, leaf switch #(k/2+1) 114 transmits the packet in accordance with the selected preferred path information, for example by placing the packet for transmission from the uplink port defined in the preferred path information. In the example of FIG. 6, leaf switch #(k/2+1) 114 transmits the packet from the appropriate uplink port to reach aggregation switch #2 134.

When the packet is received at aggregation switch #2 134, aggregation switch #2 134 determines the egress port for the packet using the preferred path information contained in the packet. For example, aggregation switch #2 134 uses the MPLS label contained in the packet header to forward the packet to the appropriate egress port, and also removes the MPLS label from the packet. The packet is thus transmitted from the appropriate uplink port to reach spine switch #2 142.

When spine switch #2 142 receives the packet, spine switch #2 142 performs conventional destination lookup and forwards the packet to aggregation switch #1 132. When aggregation switch #1 132 receives the packet, aggregation switch #1 132 performs conventional destination lookup and forwards the packet to leaf switch #1 112. Leaf switch #1 112 then forwards the packet to the destination end device.

For dynamic load balancing, a leaf switch 110 may maintain information about flowlets in a given flow. This information may be used by the leaf switch 110 to determine whether a flowlet can be switched to another egress port. Examples described herein may enable scalable flowlet switching, where flowlet state is tracked only in the leaf switches 110 of the network 100.

For example, the leaf switch 110 may store flowlet information in the form of a flowlet table, which may have up to 128 thousand entries. Each entry in the flowlet table may correspond to a current flowlet. Each entry may contain selected preferred path information for the flowlet, as well as an indicator of whether the flowlet is ready to be switched to another path. An entry in the flowlet table may be indexed by hashing selected packet header fields. An entry in the flowlet table may include the following fields, for example:

Curr_Leaf_Port_ID (e.g., 8 bits long): identifier of the egress port in the leaf switch currently used by the flowlet.

Curr_Agg_Port_ID (e.g., 8 bits long): identifier of the egress port in the subsequent aggregation currently used by the flowlet.

State (e.g., 1 bit long): indicator whether the flowlet is ready to be switched to another egress port.

Rate (e.g., 10 bits long): stores a measurement of the transmission rate of the flowlet. This field may be updated using a moving average scheme.

Where there are more than three tiers in the network, the entry may have additional fields to contain identifiers of egress ports in the additional tiers. Similarly, where there are fewer than three tiers in the network, the entry may have fewer port identifier fields.

Whether the flowlet is ready to be switched to another port may be based on a temporal criterion. For example, flowlet table aging may be used (e.g., using a mechanism similar to MAC table aging), such as using scan period in a time range from about 0.1 ms to about 50 ms. The aging result may be used to update the State field to indicate whether the flowlet is ready to be switched to another port. In some examples, a timestamp may be stored for the last received packet of a flowlet. When a new packet arrives, the arrival time for the new packet can be compared with the timestamp stored in the flowlet table, and the time gap (determined as the difference between the timestamps) is used to decide whether a flowlet is ready to be switched to another path. This may help to reduce the memory bandwidth required for an aging scan. The State field may be set to indicate that the flowlet is ready to be switched when the time gap between the timestamps of two consecutive packets exceeds a predetermined threshold. For example, the threshold may require that the time gap be larger than $\alpha \times$(the path delay of the flowlet's current path), where $\alpha$ is a configurable coefficient (e.g., in the range from 1 to 2).

The leaf switch 110 may update the flowlet information upon receiving a packet. If the flowlet information (e.g., the State field) indicates that the associated flowlet is ready to be switched to another path, this may be a trigger for the leaf switch 110 to perform the example method of FIG. 7 to select preferred path information for the flowlet. The selection of preferred path information may result in the flowlet being assigned the same preferred path as the previous flowlet (e.g., where the same preferred path has the most preferred congestion metric). The leaf switch 110 may update the flowlet information (e.g., the Curr_Leaf_Port_ID and Curr_Agg_Port_ID fields) to indicate the selected preferred path information for the flowlet. If the flowlet information indicates that the associated flowlet is not ready to be switched to another path, the currently selected preferred path information (e.g., as stored in the flowlet table) may be used to transmit the received packet.

In some examples, it may be useful to limit the bandwidth consumed by the PFP, for example in a large data center network. The congestion information carried in the PFP may be reduced, for example to include only port utilization information, to reduce the bandwidth consumed by the PFP.

For example, when the initiating aggregation switch generates a PFP, the initiating aggregation switch includes information about receive port utilization of all of its uplink ports into the PFP. The PFP is then sent through a selected uplink port Pa. Consider a PFP sent from uplink port Pa of the aggregation switch to port Py of a receiving spine switch.

Here, the transmission rate of port Pa is considered to be the same as the receiving rate of port Py. In addition, port Pa and port Py may be considered to have the same capacity. Thus, the receive port utilization of port Pa can be used as the transmit port utilization of port Py. As a result, an aggregation switch can generate a PFP that includes receive port utilization information for all uplink ports and transmit port utilization information for all downlink ports, and transmit the PFP to a selected spine switch, instead of transmitting one PFP per uplink port. This may avoid the bandwidth required for multicasting the PFP, which may be useful for very large networks. If the link to the selected spine switch fails, the aggregation switch chooses another uplink port to send the PFP. Thus, all aggregation switches in the same plane receives the PFP.

A spine switch, upon receiving the PFP, performs PFP multicast forwarding, without adding information into the PFP. Thus, a legacy spine switch may not need to be updated to support PFP processing. When an aggregation switch receives a PFP, the aggregation switch adds information about the transmit port utilization of the port at which the PFP is received. The aggregation switch then multicasts the PFP to its connected leaf switches. Thus, in this example, the PFP includes congestion information, in the form of port utilization information, collected from only aggregation switches.

The PFP may contain, in its payload, a set of records associating port utilization information with a respective port of an aggregation switch. In the records, an uplink port may be associated with the identifier of the aggregation switch while a downlink port may be associated with the identifier of the leaf switch connected to that downlink port. For example, a record may have the following fields:

Switch_ID: for an uplink port, this is an identifier identifying the aggregation switch; for a downlink port, this is an identifier identifying the leaf switch connected to the downlink port.

Port_utilization: provides information about port utilization of the uplink or downlink port, calculated as discussed previously. For a downlink port, this represents transmit port utilization. For an uplink port, this represents receive port utilization.

When the leaf switch processes the PFP, only port utilization information is used to determine the preferred path information, without using switch delay information.

In some examples, when forwarding a packet, information about the preferred path for the packet may be inserted without using a MPLS label. For example, for a Virtual Extensible Local Area Network (VxLAN) packet or a Network Virtualization using Generic Routing Encapsulation (NVGRE) packet, reserved VxLAN and NVGRE header fields may be used to store information about the preferred path.

In examples described above, the preferred path for packet forwarding may be defined in the packet header only for the upstream portion of the path, since the downstream portion can be determined using destination lookup. In some examples, the need for destination lookup may be avoided by explicitly defining the downstream portion of the preferred path as well in the packet header. This may enable lower power flowlet switching.

For example, the preferred path information inserted in the packet header may include MPLS labels for all egress ports (with the possible exception of the egress port at the source leaf switch) along the preferred path. In this way, switches in the downstream portion of the path may simply forward the packet using the egress port specified by the MPLS label and avoid the need to perform destination lookup.

To enable this, the information collected by the PFP may include port identifiers used to identify egress ports. The initiating aggregation switch generating the PFP may insert congestion information in the PFP in the form of a record including the following fields:

Leaf_ID: as described above.
Port_utilization: as described above.
Hop_delay: as described above.
DnSm_Port_ID (e.g., 8 bits long): identifier of the downlink port associated with the leaf switch identified by Leaf_ID.

The spine switch forwarding the PFP may insert congestion information in the PFP in the form of a record including the following fields:

Port_utilization: as described above.
Hop_delay: as described above.
Spine_Port_ID (e.g., 8 bits long): identifier of the spine switch port at which the PFP was received.

The BPT maintained at the leaf switch may, for each record, additionally include the fields DnSm_Port_ID and Spine_Port_ID. These two fields may also be added to each flowlet table entry.

For packet forwarding, the source leaf switch may insert three MPLS labels in the packet header instead of one, for example:

Top MPLS label as described above.
Middle MPLS label representing Spine_Port_ID from the flowlet table.
Bottom MPLS label representing DnSm_Port_ID from the flowlet table Thus, the MPLS labels in the packet header are ordered from top to bottom in the order of the ports which the packet should be sent from, defined according to the preferred path. Each switch, upon receiving the forwarded packet, removes the uppermost MPLS label and forwards the packet to the port specified by the removed MPLS label. In the example of FIG. 6, aggregation switch #2 134 removes and uses the top MPLS label, spine switch #1 142 removes and uses the middle MPLS label, and aggregation switch #1 132 removes and uses the bottom MPLS label.

The above example may be extended to include more than three MPLS labels in the packet header, for a network having a greater number of tiers. The information collected by the PFP may correspondingly include identifiers for egress ports of the additional tiers, and additional fields may be added to each entry in the flowlet table. Similarly, fewer labels may be included in the case of a network having a fewer number of tiers, the PFP may correspondingly include information for fewer tiers, and the flowlet table may include fewer fields. For each MPLS label added, an associated switch may use MPLS label lookup to simplify packet forwarding processing. This may help to achieve lower latency and lower power consumption.

Congestion metrics other than port utilization and switch delay can also be used to determine preferred path information. For example, switch delay can be calculated using the largest hop delay instead of sum of hop delay.

Although the above examples have been described in the context of a three-tiered network, the present disclosure may be similarly used for two-tier leaf-spine topology. For a two-tier network, the spine switch may generate PFPs similar to the initiating aggregation switch described above.

When preparing a packet for forwarding, the leaf switch may not need to insert preferred path information (e.g., a MPLS label) into the packet header.

Examples described herein may be implemented in existing networks, without requiring updating existing spine switches. For example, in a three-tier leaf-spine topology, port utilization may be used as the congestion metric. The spine switch may only need to multicast the PFP without modifying the PFP. Instead, the aggregation switch may monitor port utilization of its uplink ports, and use the port utilization of an uplink port as a substitute for the port utilization of the associated spine switch's port. In a two-tier leaf-spine topology, the leaf switch may generate PFPs, the spine switch may only need to multicast the PFP without modifying the PFP. Port utilization may be used as the congestion metric. Here, the leaf switch may monitor port utilization of its uplink ports, and use the port utilization of an uplink port as a substitute for the port utilization of the associated spine switch's port.

Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for collecting congestion information at a first switch of a leaf-spine network, the method comprising:
   obtaining a path finding packet, the path finding packet having a payload containing a first record with information about congestion at a second switch of the leaf-spine network;
   obtaining congestion information about congestion at the first switch, including a metric representing a measured amount of congestion at a port of the first switch;
   inserting the congestion information, including the metric representing the measured amount of congestion at the port of the first switch, as a second record into the payload of the path finding packet, the payload thereby containing the first record with the information about the congestion at the second switch and also containing the second record with the congestion information about the congestion at the first switch; and
   transmitting the path finding packet.

2. The method of claim 1, wherein obtaining the congestion information comprises measuring a port property relating to congestion at each downlink port of the first switch, and transmitting the path finding packet comprises multicasting the path finding packet from multiple uplink ports of the first switch.

3. The method of claim 1, wherein obtaining the path finding packet comprises receiving the path finding packet at a receiving port of the first switch.

4. The method of claim 3, wherein obtaining the congestion information comprises measuring a port property information relating to congestion at the receiving port, and transmitting the path finding packet comprises multicasting the path finding packet from multiple other ports different from the receiving port.

5. The method of claim 3, wherein the congestion information is inserted into the payload in association with an identifier identifying the receiving port.

6. The method of claim 1, wherein the congestion information inserted into the payload comprises at least one of port utilization information and switch delay information.

7. The method of claim 1, wherein the first switch is an aggregation switch connected to a spine switch, wherein the congestion information comprises port utilization information of port utilization of ports of the spine switch, wherein the port utilization information is used as the metric, and wherein port utilization of an egress port of the aggregation switch is used to substitute for port utilization of an ingress port of the spine switch in the port utilization information.

8. The method of claim 7, wherein transmitting the path finding packet comprises transmitting the path finding packet from the egress port.

9. The method of claim 1, wherein the congestion information collected by the path finding packet relates to congestions expected to be experienced by a packet forwarded in a direction opposite to a direction traversed by the path finding packet.

10. A first network switch in a leaf-spine network, the first switch comprising a processor configured to cause the first switch to:
    obtain a path finding packet, the path finding packet having a payload containing a first record with information about congestion at a second switch of the leaf-spine network;
    obtain congestion information about congestion at the first switch, including a metric representing a measured amount of congestion at a port of the first switch;
    insert the congestion information, including the metric representing the measured amount of congestion at the port of the first switch, as a second record into the payload of the path finding packet, the payload thereby containing the first record with the information about the congestion at the second switch and also containing the second record with the congestion information about the congestion at the first switch; and transmit the path finding packet.

11. The network switch of claim 10, wherein the processor is configured to cause the first switch to obtain the path finding packet by receiving the path finding packet at a receiving port of the first switch, to obtain the congestion information by obtaining congestion information relating to congestion at the receiving port, and to transmit the path finding packet by multicasting the path finding packet from multiple other ports different from the receiving port.

12. The network switch of claim 10, wherein the first switch is an aggregation switch connected to a spine switch, wherein the congestion information comprises port utilization information port utilization of ports of the spine switch, wherein the port utilization information is used as the metric, and wherein port utilization of an egress port of the aggregation switch is used to substitute for port utilization of an ingress port of the spine switch in the port utilization information.

* * * * *